(12) United States Patent
Xu

(10) Patent No.: US 11,623,991 B1
(45) Date of Patent: Apr. 11, 2023

(54) FLAME-RETARDANT WATERPROOF FORMALDEHYDE-FREE BOARD AND METHOD OF MANUFACTURE

(71) Applicant: Fei Xu, Coppell, TX (US)

(72) Inventor: Fei Xu, Coppell, TX (US)

(*) Notice: Subject to any disclaimer, the term of this patent is extended or adjusted under 35 U.S.C. 154(b) by 0 days.

(21) Appl. No.: 17/491,177

(22) Filed: Sep. 30, 2021

(51) Int. Cl.
*C08L 97/02* (2006.01)
*B27N 3/18* (2006.01)
*B27N 3/06* (2006.01)
*B27N 3/04* (2006.01)
*B27N 3/20* (2006.01)

(52) U.S. Cl.
CPC ............. *C08L 97/02* (2013.01); *B27N 3/04* (2013.01); *B27N 3/06* (2013.01); *B27N 3/18* (2013.01); *B27N 3/20* (2013.01); *C08L 2201/02* (2013.01); *C08L 2205/16* (2013.01)

(58) Field of Classification Search
CPC ... C08L 97/02; C08L 2201/02; C08L 2205/16
See application file for complete search history.

(56) References Cited

FOREIGN PATENT DOCUMENTS

| CN | 103224379 A | * | 7/2013 | |
|---|---|---|---|---|
| CN | 105482483 A | * | 4/2016 | ............. C08L 97/02 |
| CN | 107127841 A | * | 9/2017 | ............. B27D 1/06 |
| CN | 113500678 A | * | 10/2021 | |

OTHER PUBLICATIONS

English-language translation of CN-103224379-A, obtained Mar. 23, 2022.*
English-language translation of CN-105482483-A, obtained Mar. 23, 2022.*
English-language translation of CN-107127841-A, obtained Mar. 23, 2022.*
English-language translation of CN113500678-A, obtained Mar. 23, 2022.*

* cited by examiner

*Primary Examiner* — Liam J Heincer
(74) *Attorney, Agent, or Firm* — Leavitt Eldredge Law Firm

(57) ABSTRACT

A flame-retardant, waterproof and formaldehyde-free board is disclosed. The board includes raw material and a coagulant agent. The mass ratio of the raw material to the coagulant agent is 1:1-5. The coagulant includes Agent (A), Agent (B) and magnesium oxide at a mass ratio of 15:2:8-12. In addition, a method of manufacturing the flame-retardant, waterproof and formaldehyde-free board is disclosed.

3 Claims, 4 Drawing Sheets

FLAME-RETARDANT WATERPROOF FORMALDEHYDE-FREE BOARD AND METHOD OF MANUFACTURE

BACKGROUND

1. Field of the Invention

The present invention relates generally to flame-retardant wood materials, and more specifically to a flame-retardant board that is waterproof and formaldehyde-free, and a method for manufacturing the same.

2. Description of Related Art

Flame-retardant compositions are well known in the art and are effective means for reducing the flammability or combustibility of wood and wood materials. Wood and wood materials are often used in structural and decorative products such as construction, flooring, furniture making, and craft work.

Although effective in most applications, conventional flame-retardant wood materials have limitations. For example, conventional flame-retardant wood materials are expensive to produce, especially for commercial purposes. In addition, conventional flame-retardant wood materials often utilize adhesives that contain formaldehyde, which is toxic and harmful to humans and the environment. Because of this, the demand for non-toxic, environmentally friendly flame-retardant compositions has significantly grown.

Accordingly, it is an object of the present invention to provide a flame-retardant board that does not utilize formaldehyde-containing adhesives, and a cost-effective method of making the same.

SUMMARY OF THE INVENTION

The present invention provides a non-toxic and environmentally benign flame-retardant board that is waterproof and formaldehyde-free.

The present invention provides a method of manufacturing a non-toxic and environmentally benign flame-retardant board that is waterproof and formaldehyde-free, where costs are reduced.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
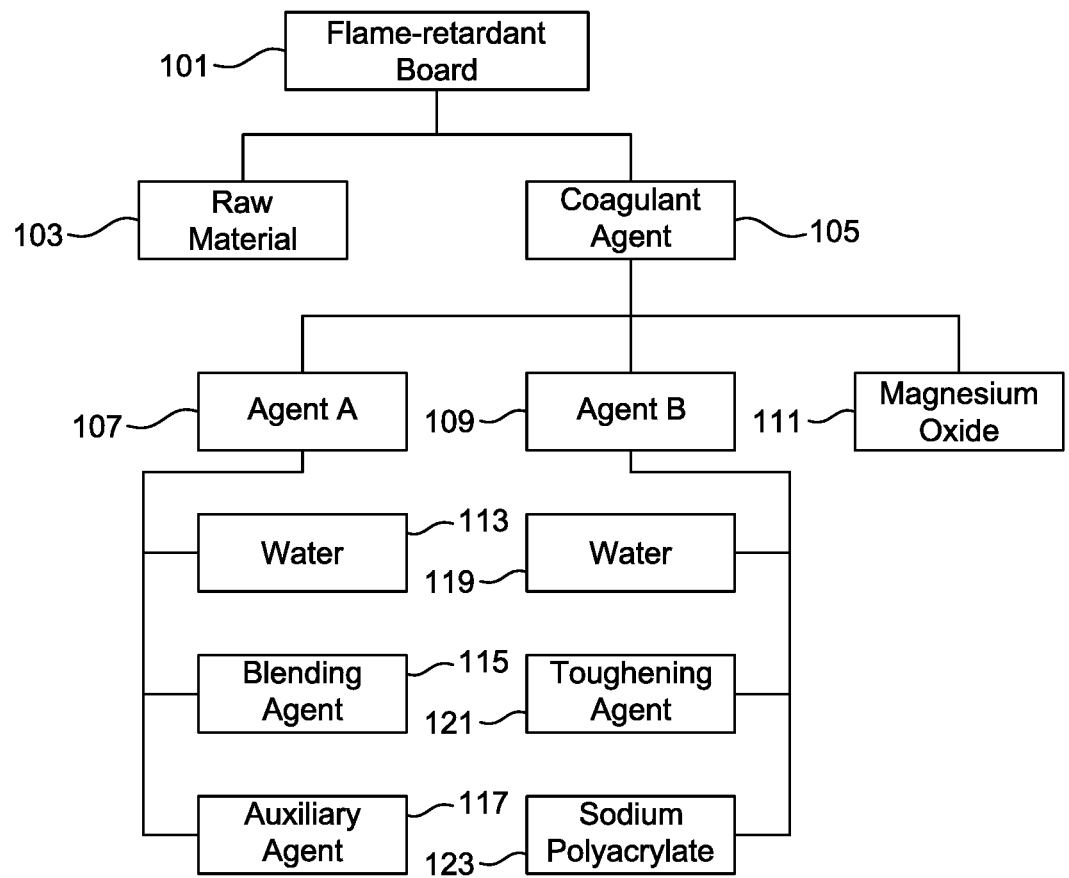
FIG. 1 is a diagram of compositions associated with a flame-retardant board in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional fire-retardant wood materials. Specifically, the present invention provides for a cost-efficient flame-retardant board that is waterproof and formaldehyde-free. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Although boards are described for purposes of description, embodiments of the present disclosure are not limited thereto and may also apply to timbers, lumbers, plates, slabs, or other various types of wood structures. The term "board" may be interchangeably used with the term "plate" and/or with the term "slab".

Referring now to the drawings wherein like reference characters identify corresponding or similar elements throughout the several views, FIG. 1 depicts a diagram of compositions associated with a flame-retardant board 101 in accordance with a preferred embodiment of the present application. It will be appreciated that the flame-retardant board 101 overcomes one or more of the above-listed problems commonly associated with conventional flame-retardant wood materials.

In the contemplated embodiment, the flame-retardant board 101 comprises of one or more raw materials 103 and a coagulant agent 105 at a mass ratio of 1:1-5.

The one or more raw materials 103 include measurements no greater than approximately 5 mm long and no greater than approximately 1 mm wide. In addition, the one or more raw materials 103 includes moisture content maintained at from about 5 to about 15%. It should be appreciated that the one or more raw materials 103 include wood, bamboo hay, corn stover, straw, wheat stalk, other plants' root, stem, stalk or leaf, or a combination or multiplicity thereof.

The coagulant agent 105 comprises of Agent A 107, Agent B 109, and magnesium oxide 111 at a mass ratio of approximately 15:2:8-12.

Agent A 107 comprises of about 60 parts of water 113, from about 1 to about 10 parts of blending agent 115, and from about 30 to about 39 parts of auxiliary agent 117. The blending agent 115 includes citric acid, acetic acid, ethylene glycol, or a combination or multiplicity thereof. The auxiliary agent 117 includes magnesium sulfate, calcium carbonate, or a combination thereof.

Agent B 109 comprises of from about 70 to about 90 parts of water 119, from about 10 to about 30 parts of toughening agent 121, and from about 1 to about 10 parts of sodium polyacrylate 123. The toughening agent 121 includes silicon micro-powder.

Figure 2:
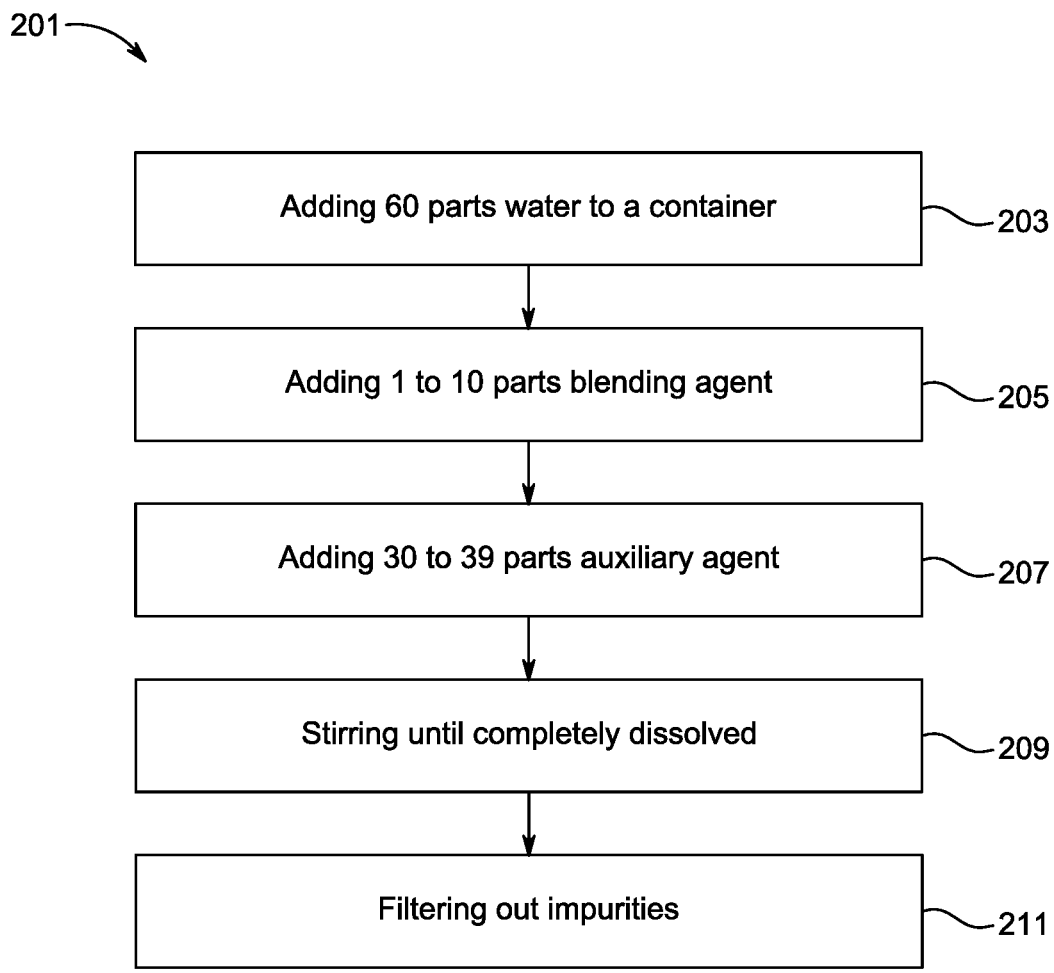
FIG. 2 is a flowchart of a method of preparing Agent A of FIG. 1.

In FIG. 2, a flowchart 201 illustrating a method for preparing Agent A 107 is shown. After adding about 60 parts of water to a container, about 1 to about 10 parts of blending agent and about 30 to about 39 parts of auxiliary agent are added, as shown with steps 203-207. The blending agent and the auxiliary agent are stirred until completely dissolved in the water, as shown with step 209. Once dissolved, impurities are filtered out, as shown with step 211.

Figure 3:
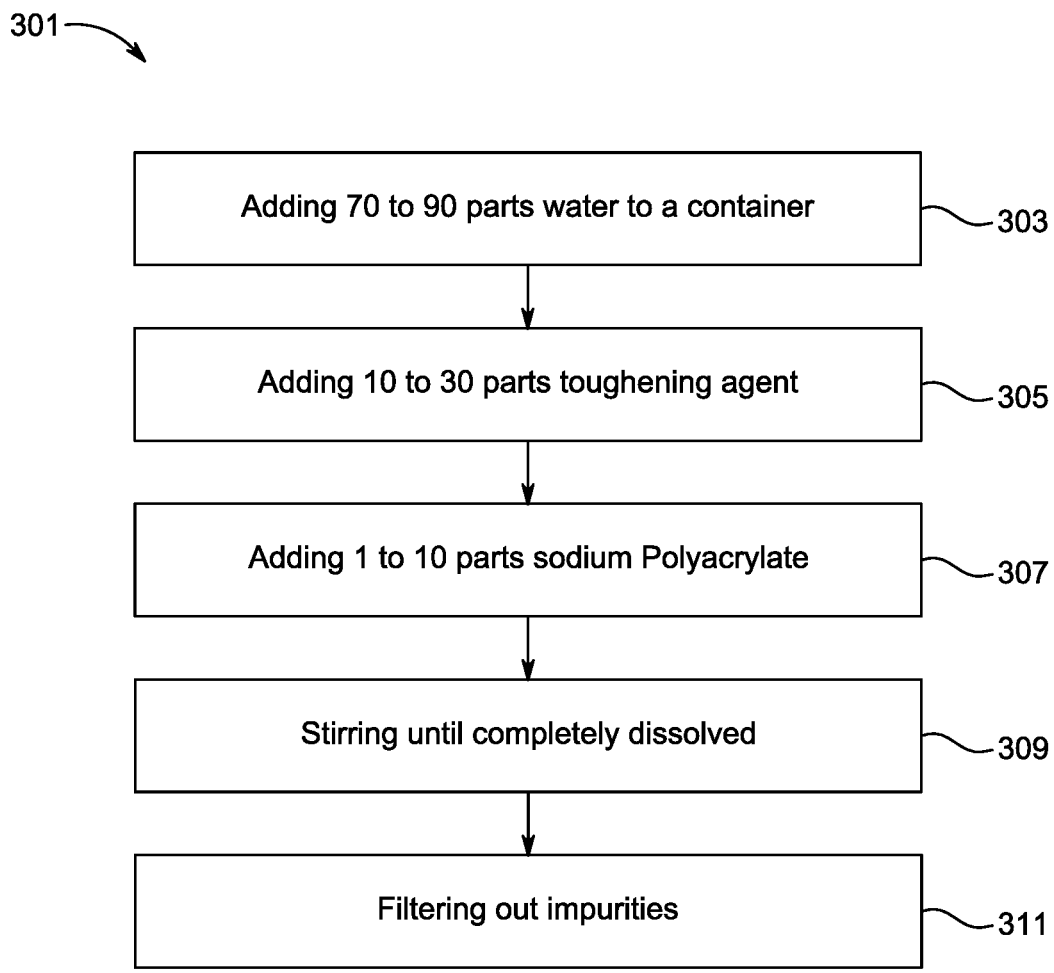
FIG. 3 is a flowchart of a method of preparing Agent B of FIG. 1.

In FIG. 3, a flowchart 301 illustrating a method for preparing Agent B 109 is shown. After adding about 70 to about 90 parts of water to a container, about 10 to about 30 parts of toughening agent and about 1 to about 10 parts of sodium polyacrylate are added, as shown with steps 303-307. The toughening agent and the sodium polyacrylate are stirred until completely dissolved in the water, as shown with step 309. Once dissolved, impurities are filtered out, as shown with step 311.

Figure 4:
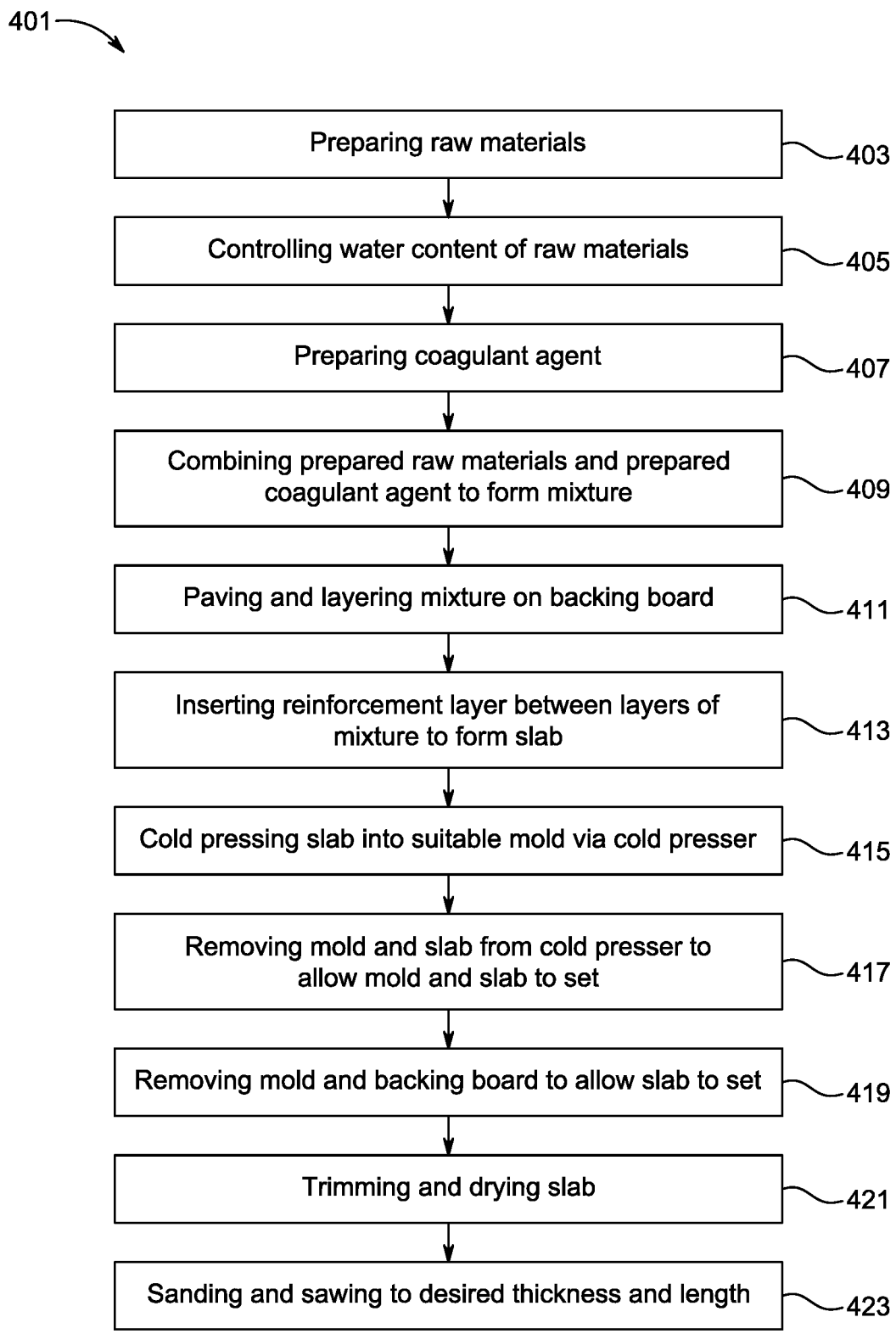
FIG. 4 is a flowchart illustrating a manufacturing process for a flame-retardant board in accordance with the present invention.

In FIG. 4, a flowchart 401 illustrates a method of manufacturing the flame-retardant board 101. For purposes of clarity, the following discussion references the flowcharts of FIG. 2 and FIG. 3 in conjunction with flowchart 401 of FIG. 4, to describe embodiments of the present invention.

In step 403 of FIG. 4, one or more raw materials are prepared. In one embodiment, the one or more raw materials are pulverized to a length of not more than approximately 5 mm, a width of not greater than approximately 1 mm. It should be appreciated that the one or more raw materials include wood, bamboo, hay, corn stover, straw, wheat stalk or other plants' root, stem, stalk or leaf or other similar materials.

In step 405 of FIG. 4, the one or more raw materials are moisture treated to control the water content thereof. In one embodiment, the one or more raw materials are treated such that the one or more raw materials maintain a water content of from about 5 to about 15%.

In step 407 of FIG. 4, the coagulant agent is prepared. Step 407 includes steps 203-211 and steps 303-311 of FIGS. 2 and 3, respectively, for preparing Agents A and B, respectively. In one embodiment, the blending agent of step 205 of FIG. 2 is citric acid, acetic acid, ethylene glycol, or a combination or multiplicity thereof. In one embodiment, the auxiliary agent of step 207 of FIG. 2 is magnesium sulfate, calcium carbonate, or a combination thereof. In one embodiment, the toughening agent of step 305 of FIG. 3 includes silicon powder.

Step 407 of FIG. 4 also includes weighing Agent A, Agent B and magnesium oxide according to a mass ratio of 15:2:8-12. Once the mass ratio is obtained, Agent A, Agent B and magnesium oxide are mixed well to form a first mixture and set aside.

In step 409 of FIG. 4, the prepared one or more raw materials and the prepared coagulant agent are combined following a mass ratio of 1:1-5 to form a second mixture. The mixture is stirred thoroughly and set aside.

In step 411 of FIG. 4, the mixture formed from step 409 is paved and layered on a backing board. The mixture is evenly spread on the backing board from about 2 to about 5 layers.

In step 413 of FIG. 4, a reinforcement layer is inserted between each layer of the mixture to form a slab. In one embodiment, the reinforcement layer is made of solid wood veneer, polyester fiber mesh, non-woven cloth, polyester fiber cloth, other similar materials, or a combination or multiplicity thereof.

In step 415 of FIG. 4, the slab formed from step 413 is placed with a backing board in a suitable mold and undergoes cold pressing via a cold presser using a pressure setting of from about 3 to about 20 MPa. When the pressure of the cold presser is balanced, the mold is locked while still maintaining the pressure.

In step 417 of FIG. 4, the mold and slab are removed from the cold presser and are set at room temperature for from about 1 to about 3 days.

In step 419 of FIG. 4, the mold and backing board are removed to allow the slab to set in a natural environment for from about 3 to about 10 days.

In step 421 of FIG. 4, the slab is trimmed to remove burrs and then the slab is dried via a dryer at a temperature setting of from about 100 to about 170 Celsius for from about 15 to about 180 minutes to achieve the final moisture content of from about 8 to about 12 percent. In one embodiment, a diamond saw blade is used to trim the burrs from the slab.

In step 423 of FIG. 4, the slab is sanded and sawed to a desired thickness and a desired length. In one embodiment, an edge saw is used to cut the slab to a desired length.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A flame-retardant board comprising one or more raw materials and a coagulant agent at a mass ratio of 1:1-5, wherein the one or more raw materials include moisture content maintained at from about 5 to about 15%, wherein the one or more raw materials are approximately no greater than 5 mm long and approximately no greater than 1 mm wide, wherein the coagulant agent comprises agent (A), agent (B), and magnesium oxide at a mass ratio of 15:2:8-12, wherein:

agent (A) is about 60 parts of water, from about 1 to about 10 parts of blending agent, and from about 30 to about 39 parts of auxiliary agent, wherein the blending agent is citric acid, acetic acid, ethylene glycol, or a combination or multiplicity thereof, wherein the auxiliary agent is magnesium sulfate, calcium carbonate, or a combination thereof;

agent (B) is from about 70 to about 90 parts of water, from about 10 to about 30 parts of toughening agent, and from about 1 to about 10 parts of sodium polyacrylate, wherein the toughening agent includes silicon micropowder.

2. The flame-retardant board of claim 1, wherein the one or more raw materials include wood, bamboo, hay, corn stover, straw, wheat stalk, plant root, plant stem, plant stalk, plant leaf, or a combination or multiplicity thereof.

3. A method of manufacturing a flame-retardant board comprising of one or more raw materials and a coagulant agent, wherein the coagulant agent comprises of an agent (A), an agent (B), and a magnesium oxide, comprising:

creating a prepared one or more raw materials by preparing the one or more raw materials, wherein the one or more raw materials are pulverized to no greater than 5 mm long and approximately no greater than 1 mm wide, wherein the one or more raw materials are moisture treated to maintain water content of from about 5 to about 15%, wherein the one or more raw materials comprise wood, bamboo, hay, corn stover, straw, wheat stalk, plant root, plant stem, plant stalk, plant leaf, or a combination or multiplicity thereof;

preparing the agent (A), wherein the preparation of the agent (A) includes the steps of:

adding about 60 parts of water to a first container;

adding about 1 to about 10 parts of blending agent and about 30 to about 39 parts of auxiliary agent to the first container;

stirring until the blending agent and the auxiliary agent are completely dissolved in the water; and filtering out impurities;

wherein the blending agent includes citric acid, acetic acid, ethylene glycol, or a combination or multiplicity thereof; and wherein the auxiliary agent includes magnesium sulfate, calcium carbonate, or a combination thereof;

preparing the agent (B), wherein the preparation of agent (B) includes the steps of:

adding about 70 to about 90 parts of water to a second container;

adding about 10 to about 30 parts of toughening agent and about 1 to about 10 parts of sodium polyacrylate to the second container;

stirring until the toughening agent and the sodium polyacrylate are completely dissolved in the water; and filtering out impurities;

wherein the toughening agent includes silicon micropowder;

weighing the agent (A), the agent (B), and the magnesium oxide according to a mass ratio of 15:2:8-12;

forming a prepared coagulant by combining the agent (A), the agent (B), and the magnesium oxide according to a mass ratio of 15:2:8-12 to form a first mixture;

combining the one or more raw materials and the coagulant agent according to a mass ratio of 1:1-5 to form a second mixture;

paving and layering the second mixture on a backing board;

placing the slab with a backing plate in a suitable mold;

cold pressing the slab with the backing place in the mold;

once pressure of the cold press is balanced, locking the mold while maintaining the pressure;

removing the mold and the slab from the cold press;

setting the mold and slab;

removing the mold and the backing plate from the slab to allow the slab to set;

trimming the slab to remove burrs;

drying the slab to achieve a moisture content of from about 8 to about 12 percent; and sanding and sawing the slab to a desired thickness, a desired length, or a combination thereof.

\* \* \* \* \*